United States Patent
Goyal et al.

(10) Patent No.: US 12,254,421 B2
(45) Date of Patent: Mar. 18, 2025

(54) MACHINE LEARNING KNOWLEDGE MANAGEMENT BASED ON LIFELONG BOOSTING IN PRESENCE OF LESS DATA

(71) Applicant: NEC Corporation, Tokyo (JP)

(72) Inventors: Anil Goyal, Dossenheim (DE); Ammar Shaker, Heidelberg (DE); Francesco Alesiani, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/530,331

(22) Filed: Dec. 6, 2023

(65) Prior Publication Data
US 2024/0127087 A1   Apr. 18, 2024

Related U.S. Application Data

(63) Continuation of application No. 16/889,825, filed on Jun. 2, 2020, now Pat. No. 11,995,566.

(51) Int. Cl.
*G06N 5/04* (2023.01)
*G06N 20/00* (2019.01)

(52) U.S. Cl.
CPC ............. *G06N 5/04* (2013.01); *G06N 20/00* (2019.01)

(58) Field of Classification Search
CPC .................................. G06N 5/04; G06N 20/00
See application file for complete search history.

(56) References Cited

U.S. PATENT DOCUMENTS

| | | | |
|---|---|---|---|
| 10,325,223 B1 | 6/2019 | Arel et al. | |
| 2006/0062451 A1 | 3/2006 | Li | G06K 9/6256 |
| | | | 382/159 |
| 2012/0263376 A1 | 10/2012 | Wang | G06K 9/6262 |
| | | | 382/160 |
| 2017/0337464 A1 | 11/2017 | Rabinowitz et al. | |
| 2019/0034798 A1 | 1/2019 | Yu et al. | |
| 2021/0064989 A1 | 3/2021 | Shaker | G06N 3/08 |
| 2021/0201116 A1 | 7/2021 | Rabinowitz | G06F 17/16 |
| 2021/0209514 A1 | 7/2021 | Kim et al. | |

FOREIGN PATENT DOCUMENTS

WO    WO 2019/202073 A1    10/2019

OTHER PUBLICATIONS

Parisi, German I. et al. "Continual lifelong learning with neural networks: A review." Neural Networks, arXiv:1802.07569v4, Feb. 11, 2019.

Silver, Daniel L., Qiang Yang, and Lianghao Li. "Lifelong machine learning systems: Beyond learning algorithms," 2013 AAAI spring symposium series, Mar. 2013.

(Continued)

*Primary Examiner* — Hau H Hoang
(74) *Attorney, Agent, or Firm* — Sughrue Mion, PLLC

(57) ABSTRACT

A method for lifelong machine learning using boosting includes receiving a new task and a learning sample for the new task. A distribution of weights is learned over the learning sample using previously learned classifiers from old tasks. A set of task-specific classifiers are learned for the new task using a boosting algorithm and the distribution of weights over the learning sample, whereby the distribution of weights over the learning sample is updated using the task-specific classifiers for the new task.

13 Claims, 12 Drawing Sheets

(56) References Cited

OTHER PUBLICATIONS

De Lange, Matthias, et al. "Continual learning: A comparative study on how to defy forgetting in classification tasks." arXiv preprint arXiv:1909.08383v1, Sep. 18, 2019.
Van de Ven, Gido M., and Andreas S. Tollas. "Three scenarios for continual learning," arXiv preprint arXiv: 1904.07734v1, Apr. 15, 2019.
Pai, Gautam et al. "Lifelong Machine Learning and Root Cause Analysis for Large-Scale Cancer Patient Data," Journal of Big Data, Dec. 3, 2019.
Mallya, Arun and Lazebnik, Svetlana, "PackNet: Adding Multiple Tasks to a Single Network by Iterative Pruning," arXiv:1711.05769v2, May 13, 2018.
Serra, Joan et al. "Overcoming Catastrophic Forgetting with Hard Attention to the Task," arXiv:1801.01423v3, May 29, 2018.
La, Lei et al. "Multiclass Boosting With Adaptive Group-Based kNN and its Application in Text Categorization," Hindawi Publishing Corporation, Mathematical Problems in Engineering, vol. 2012, Article ID 793490, 24 pages, Apr. 26, 2012.
Dai, Wenyuan et al. "Boosting For Transfer Learning," Proceedings of the 24th International Conference on Machine Learning, Corvallis, OR, Jun. 2007.
Peng, Jian et al. "Overcoming Long-term Catastrophic Forgetting through Adversarial Neural Pruning and Synaptic Consolidation," arXiv:1912.09091v1, Dec. 19, 2019.
Lopez-Paz, David and Ranzato, Marc Aurelio, "Gradient Episodic Memory for Continual Learning," arXiv:1706.08840v5, Nov. 4, 2017.
Wang, Hao et al. "Forward and Backward Knowledge Transfer for Sentiment Classification," Proceedings of Machine Learning Research 101:457-472, ACML, Nov. 2019.
Zhang, Jie et al. "Regularize, Expand and Compress: Multi-task based Lifelong Learning via NonExpansive AutoML," arXiv:1903.08362v1, Mar. 20, 2019.
Selective Transfer Between Learning Tasks Using Task-Based Boosting (Year: 2011).
US Notice of Allowance for U.S. Appl. No. 18/530,871, mailed on Jul. 18, 2024.

Input: Let $\mathcal{T}$ is a set of $T$ tasks. For each task $t \in \mathcal{T}$, we receive a learning sample $S_t = \{(x_i^t, y_i^t)\}_{i=1}^{n_t}$
Initialize: We maintain a Knowledge Base (KB) such that $\forall t \in \mathcal{T}$, we have $\mathcal{D}_{KB}^t = \{S_t', D_t'\}$, $\mathcal{H}_{KB}^t$ and $Q_{KB}^t$.
Let $N$ be the number of iterations for boosting algorithm
for $t = 1$ *to* $T$ do

$\forall x_i^t \in S_t, \mathcal{D}_t(x_i) \leftarrow 1/n_t$  //*Uniform distribution over the learning sample*//
 //*Step 1: For new task $t$, learn weights over previous tasks' classifiers*//

- $\forall t' < t, \forall h_{KB}^{t'} \in \mathcal{H}_{KB}^{t'}$: Compute $Q_{KB}^t(h_{KB}^{t'}) = \frac{1}{2}\left[\ln\left(\frac{1-R_{\mathcal{D}_t}(h_{KB}^{t'})}{R_{\mathcal{D}_t}(h_{KB}^{t'})}\right)\right]$ where $R_{\mathcal{D}_t}(h_{KB}^{t'})$ is weighted error on $S_t$

- $\forall (x_i^t, y_i^t) \in \mathcal{D}_t, \mathcal{D}_t(x_i^t) \leftarrow \dfrac{\mathcal{D}_t(x_i^t)\exp\left(\frac{1}{t}\sum_{j=1}^{t-1}\mathbb{E}_{h_{KB}^j \sim \mathcal{H}_{KB}^j} I[h_{KB}^j(x_i^t) \neq y_i^t]\right)}{\sum_{j=1}^{n_t} \mathcal{D}_t(x_j^t)\exp\left(\frac{1}{t}\sum_{j=1}^{t-1}\mathbb{E}_{h_{KB}^j \sim \mathcal{H}_{KB}^j} I[h_{KB}^j(x_i^t) \neq y_i^t]\right)}$ //*Step 2: For new task $t$, learn task specific classifiers. Select few hard examples and prune classifiers for KB*//

- Run boosting algorithm (for e.g. Adaboost) with $D_t$ as distribution over samples $S_t$ for $N$ iterations. It returns set of task specific classifiers $H_t$ and distribution over samples $D_t$.
 - Select few hard examples $S_{t'}$ from $S_t$ based on $D_t$ and update $\mathcal{D}_{KB}^t = \{S_t', D_t'\}$
 - Classifier-weight based pruning of task specific classifiers. Finally, update $\mathcal{H}_{KB}^t$.

//*Step 3: For previous tasks $t' < t$, learn weights over new tasks' classifiers*//

- $\forall t' < t, \forall h_{KB}^t \in \mathcal{H}_{KB}^t$: Compute $Q_{KB}^{t'}(h_{KB}^t) = \frac{1}{2}\left[\ln\left(\frac{1-R_{\mathcal{D}_{t'}}(h_{KB}^t)}{R_{\mathcal{D}_{t'}}(h_{KB}^t)}\right)\right]$ where $R_{\mathcal{D}_{t'}}(h_{KB}^t)$ is error on $S_{t'}'$

- For all the tasks $t' < t$, update the distribution over samples:

$\forall (x_i^{t'}, y_i^{t'}) \in \mathcal{D}_{t'}, \mathcal{D}_{t'}(x_i^{t'}) \leftarrow \dfrac{\mathcal{D}_{t'}(x_i^{t'})\exp\left(\mathbb{E}_{h_{KB}^t \sim \mathcal{H}_{KB}^t} I[h_{KB}^t(x_i^{t'}) \neq y_i^{t'}]\right)}{\sum_{j=1}^{n_{t'}} \mathcal{D}_{t'}(x_j^{t'})\exp\left(\mathbb{E}_{h_{KB}^t \sim \mathcal{H}_{KB}^t} I[h_{KB}^t(x_j^{t'}) \neq y_j^{t'}]\right)}$ end
Return: Knowledge Base KB. For any example from task $t$, we predict the output by majority vote over all the task specific classifiers in KB which are weighted according to $Q_{KB}^t$ and weights over tasks $W_{KB}$

FIG. 3

| Algorithm | Split MNIST | | | | Permuted MNIST | | | |
|---|---|---|---|---|---|---|---|---|
| | LA | RA | BTI | FTI | LA | RA | BTI | FTI |
| IndependentAda | 96.680 | 96.680 | 0.0 | 0.0 | 78.195 | 78.195 | 0.0 | 0.0 |
| ProgressiveAda | 96.538 | 96.538 | 0.0 | -0.142 | 78.814 | 78.814 | 0.0 | 0.619 |
| IndependentXGB | 96.064 | 96.064 | 0.0 | -0.616 | 73.616 | 73.613 | 0.0 | -4.579 |
| ProgressiveXGB | 96.107 | 96.107 | 0.0 | -0.573 | 74.038 | 74.038 | 0.0 | -4.157 |
| OnlineXGB | 90.725 | 71.026 | -19.699 | -5.955 | 70.071 | 58.489 | -11.582 | -8.124 |
| MajorityVote | 78.028 | 78.028 | 0.0 | -18.652 | 61.952 | 61.952 | 0.0 | -16.243 |
| Adaboost$_{Full Data}$ | 89.320 | 89.320 | 0.0 | -7.300 | 80.181 | 80.181 | 0.0 | 1.986 |
| LLBoost | 96.818 | 96.852 | 0.034 | 0.138 | 77.936 | 77.934 | -0.002 | -0.259 |

FIG. 7

| Algorithm | Task Acc. \ Task Seq. | Split MNIST | | | | |
|---|---|---|---|---|---|---|
| | | Task 1 | Task 2 | Task 3 | Task 4 | Task 5 |
| IndependentAda | | 0.99724 | 0.977 | 0.98885 | 0.97098 | 0.8913 |
| ProgressiveAda | | 0.99740 | 0.97793 | 0.98081 | 0.97087 | 0.89109 |
| IndependentXGB | | 0.99742 | 0.97608 | 0.98472 | 0.96768 | 0.8773 |
| ProgressiveXGB | | 0.99742 | 0.97816 | 0.98481 | 0.9676 | 0.87732 |
| Majority Vote | | 0.7441 | 0.9224 | 0.7325 | 0.8310 | 0.6712 |
| Adaboost Full Data | | 0.99558 | 0.96868 | 0.91419 | 0.9105 | 0.6770 |
| Online XGB | Task 1 | 0.99762 | 0.60224 | 0.39092 | 0.50246 | 0.4920 |
| | Task 2 | | 0.97438 | 0.91328 | 0.8574 | 0.80424 |
| | Task 3 | | | 0.96454 | 0.81052 | 0.63732 |
| | Task 4 | | | | 0.85046 | 0.8775 |
| | Task 5 | | | | | 0.74028 |
| LLBoost | Task 1 | 0.99742 | 0.99738 | 0.9974 | 0.99752 | 0.99746 |
| | Task 2 | | 0.97734 | 0.97728 | 0.97708 | 0.97748 |
| | Task 3 | | | 0.97236 | 0.97154 | 0.97178 |
| | Task 4 | | | | 0.9731 | 0.9752 |
| | Task 5 | | | | | 0.9207 |

FIG. 8

| Algorithm | Task Acc. / Task Seq. | Permuted MNIST | | | | |
|---|---|---|---|---|---|---|
| | | Task 1 | Task 2 | Task 3 | Task 4 | Task 5 |
| IndependentAda | | 0.929923 | 0.91066 | 0.8423 | 0.67211 | 0.55544 |
| ProgressiveAda | | 0.92864 | 0.91466 | 0.84117 | 0.69004 | 0.50617 |
| IndependentXGB | | 0.91340 | 0.89413 | 0.82800 | 0.50417 | 0.45086 |
| ProgressiveXGB | | 0.91343 | 0.90608 | 0.83468 | 0.5967 | 0.45104 |
| Majority Vote | | 0.8063 | 0.78829 | 0.69466 | 0.4665 | 0.3418 |
| Adaboost$_{Full Data}$ | | 0.92830 | 0.91124 | 0.85404 | 0.7137 | 0.60164 |
| Online XGB | Task 1 | 0.93414 | | | | |
| | Task 2 | | 0.88542 | | | |
| | Task 3 | | 0.90126 | 0.85276 | | |
| | Task 4 | | | 0.79898 | 0.82584 | 0.73838 |
| | Task 5 | | | | 0.70082 | 0.78932 |
| | | | | | 0.52068 | 0.04442 |
| | | | | | | 0.40888 |
| | | | | | | 0.34485 |
| LLBoost | Task 1 | 0.92008 | | | | |
| | Task 2 | | 0.92892 | 0.92892 | | |
| | Task 3 | | 0.90976 | 0.90978 | 0.92908 | 0.92894 |
| | Task 4 | | | 0.8392 | 0.90086 | 0.90082 |
| | Task 5 | | | | 0.83046 | 0.83956 |
| | | | | | 0.66274 | 0.66236 |
| | | | | | | 0.55606 |

FIG. 9

| Algorithm | Split MNIST | | | Permuted MNIST | | |
|---|---|---|---|---|---|---|
| | LA | RA | BTI | FTI | LA | RA | BTI | FTI |
| IndependentAda | 98.075 | 98.075 | 0.0 | 0.0 | 83.082 | 83.082 | 0.0 | 0.0 |
| ProgressiveAda | 98.207 | 98.207 | 0.0 | 0.132 | 83.119 | 83.119 | 0.0 | 0.037 |
| IndependentXGB | 96.064 | 96.064 | 0.0 | −2.011 | 73.616 | 73.613 | 0.0 | −9.466 |
| ProgressiveXGB | 96.107 | 96.107 | 0.0 | −1.968 | 74.038 | 74.038 | 0.0 | −9.044 |
| OnlineXGB | 90.725 | 71.026 | −19.699 | −7.380 | 70.071 | 58.489 | −11.582 | −13.011 |
| Majority Vote | 84.444 | 84.444 | 0.0 | −13.631 | 64.669 | 64.669 | 0.0 | −18.413 |
| Adaboost_Full Data | 86.209 | 86.209 | 0.0 | −11.866 | 82.782 | 82.782 | 0.0 | −0.300 |
| LLBoost | 98.189 | 98.134 | −0.055 | 0.114 | 83.194 | 83.200 | 0.006 | 0.112 |

FIG. 10

| Algorithm | Task Acc. / Task Seq. | Split MNIST | | | | |
|---|---|---|---|---|---|---|
| | | Task 1 | Task 2 | Task 3 | Task 4 | Task 5 |
| IndependentAda | Task 1 | 0.9986 | 0.9828 | 0.9017 | 0.9896 | 0.9408 |
| ProgressiveAda | Task 2 | 0.99828 | 0.98374 | 0.90314 | 0.99264 | 0.94258 |
| IndependentXGB | Task 3 | 0.99742 | 0.97608 | 0.98472 | 0.96768 | 0.8773 |
| ProgressiveXGB | Task 4 | 0.99742 | 0.97816 | 0.98481 | 0.9676 | 0.87732 |
| MajorityVote | Task 5 | 0.9835 | 0.8453 | 0.7924 | 0.9456 | 0.6533 |
| Adaboost_Full Data | | 0.9866 | 0.9747 | 0.9354 | 0.9014 | 0.5020 |
| Online XGB | Task 1 | 0.99762 | 0.60224 | 0.30992 | 0.50246 | 0.4920 |
| | Task 2 | | 0.97438 | 0.91328 | 0.8574 | 0.80424 |
| | Task 3 | | | 0.96454 | 0.81952 | 0.65732 |
| | Task 4 | | | | 0.85046 | 0.8775 |
| | Task 5 | | | | | 0.74028 |
| LLBoost | Task 1 | 0.9984 | 0.9985 | 0.9984 | 0.9984 | 0.9984 |
| | Task 2 | | 0.98298 | 0.98298 | 0.98214 | 0.98226 |
| | Task 3 | | | 0.99362 | 0.9931 | 0.99212 |
| | Task 4 | | | | 0.98922 | 0.98892 |
| | Task 5 | | | | | 0.94498 |

FIG. 11

| Algorithm | Task Acc. \ Task Seq. | Permuted MNIST | | | | |
|---|---|---|---|---|---|---|
| | | Task 1 | Task 2 | Task 3 | Task 4 | Task 5 |
| IndependentAda | Task 1 | 0.94108 | 0.92344 | 0.87484 | 0.75618 | 0.65855 |
| ProgressiveAda | Task 2 | 0.94029 | 0.92708 | 0.88428 | 0.75636 | 0.64704 |
| IndependentXGB | Task 3 | 0.91349 | 0.89413 | 0.82806 | 0.59417 | 0.45086 |
| ProgressiveXGB | Task 4 | 0.91343 | 0.90608 | 0.83468 | 0.59067 | 0.45104 |
| Majority Vote | Task 5 | 0.80139 | 0.76626 | 0.69556 | 0.53443 | 0.43580 |
| Adaboost<sub>Full Data</sub> | | 0.94060 | 0.92352 | 0.87748 | 0.75174 | 0.64578 |
| Online XGB | Task 1 | 0.93414 | 0.88542 | 0.82358 | 0.7965 | 0.78838 |
| | Task 2 | | 0.90126 | 0.85276 | 0.82584 | 0.78932 |
| | Task 3 | | | 0.79898 | 0.70092 | 0.64442 |
| | Task 4 | | | | 0.52068 | 0.40388 |
| | Task 5 | | | | | 0.34485 |
| LLBoost | Task 1 | 0.94016 | 0.93898 | 0.93052 | 0.93838 | 0.9374 |
| | Task 2 | | 0.9226 | 0.92254 | 0.9228 | 0.92268 |
| | Task 3 | | | 0.8741 | 0.87412 | 0.87346 |
| | Task 4 | | | | 0.75774 | 0.76134 |
| | Task 5 | | | | | 0.66514 |

FIG. 12

MACHINE LEARNING KNOWLEDGE MANAGEMENT BASED ON LIFELONG BOOSTING IN PRESENCE OF LESS DATA

This application is a Continuation of U.S. application Ser. No. 16/889,825 filed on Jun. 2, 2020, the contents of all of which are incorporated herein by reference, in their entirety.

FIELD

The present invention relates to machine learning, and in particular to lifelong machine learning and boosting.

BACKGROUND

Machine learning aims at learning an efficient model for a particular task. However, the learned machine learning model is a static model and it is incapable of adapting to new tasks without forgetting on previously learned tasks/knowledge. Thus, for every new task, the machine learning model has to be re-trained from scratch using a large number of labeled training examples.

Parisi, German I., et al., "Continual lifelong learning with neural networks: A review," Neural Networks (February 2019); Silver, Daniel L., et al., "Lifelong machine learning systems: Beyond learning algorithms," Association for the Advancement of Artificial Intelligence (AAAI) Spring Symposium Series, pp. 49-55 (2013); De Lange, Matthias, et al., Continual learning: A comparative study on how to defy forgetting in classification tasks." arXiv preprint arXiv: 1909.08383 (September 2019); and van de Ven, Gido M., et al "Three scenarios for continual learning," arXiv preprint arXiv:1904.07734 (April 2019), each of which is hereby incorporated by reference herein, discuss different continual and lifelong machine learning methods and systems.

SUMMARY

In an embodiment, the present invention provides a method for lifelong machine learning using boosting includes receiving a new task and a learning sample for the new task. A distribution of weights is learned over the learning sample using previously learned classifiers from old tasks. A set of task-specific classifiers are learned for the new task using a boosting algorithm and the distribution of weights over the learning sample, whereby the distribution of weights over the learning sample is updated using the task-specific classifiers for the new task.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 3 shows pseudocode for the machine learning algorithm according to an embodiment of the present invention;

FIG. 7 shows experimental results for different methods with decision trees as the base learner;

FIG. 8 shows experimental results for different methods and individual task performance with decision trees as the base learner for a first dataset;

FIG. 9 shows experimental results for different methods and individual task performance with decision trees as the base learner for a second dataset;

FIG. 10 shows experimental results for different methods with random forests as the base learner;

FIG. 11 shows experimental results for different methods and individual task performance with random forests as the base learner for the first dataset; and FIG. 12 shows experimental results for different methods and individual task performance with random forests as the base learner for the second dataset.

DETAILED DESCRIPTION

Figure 1:
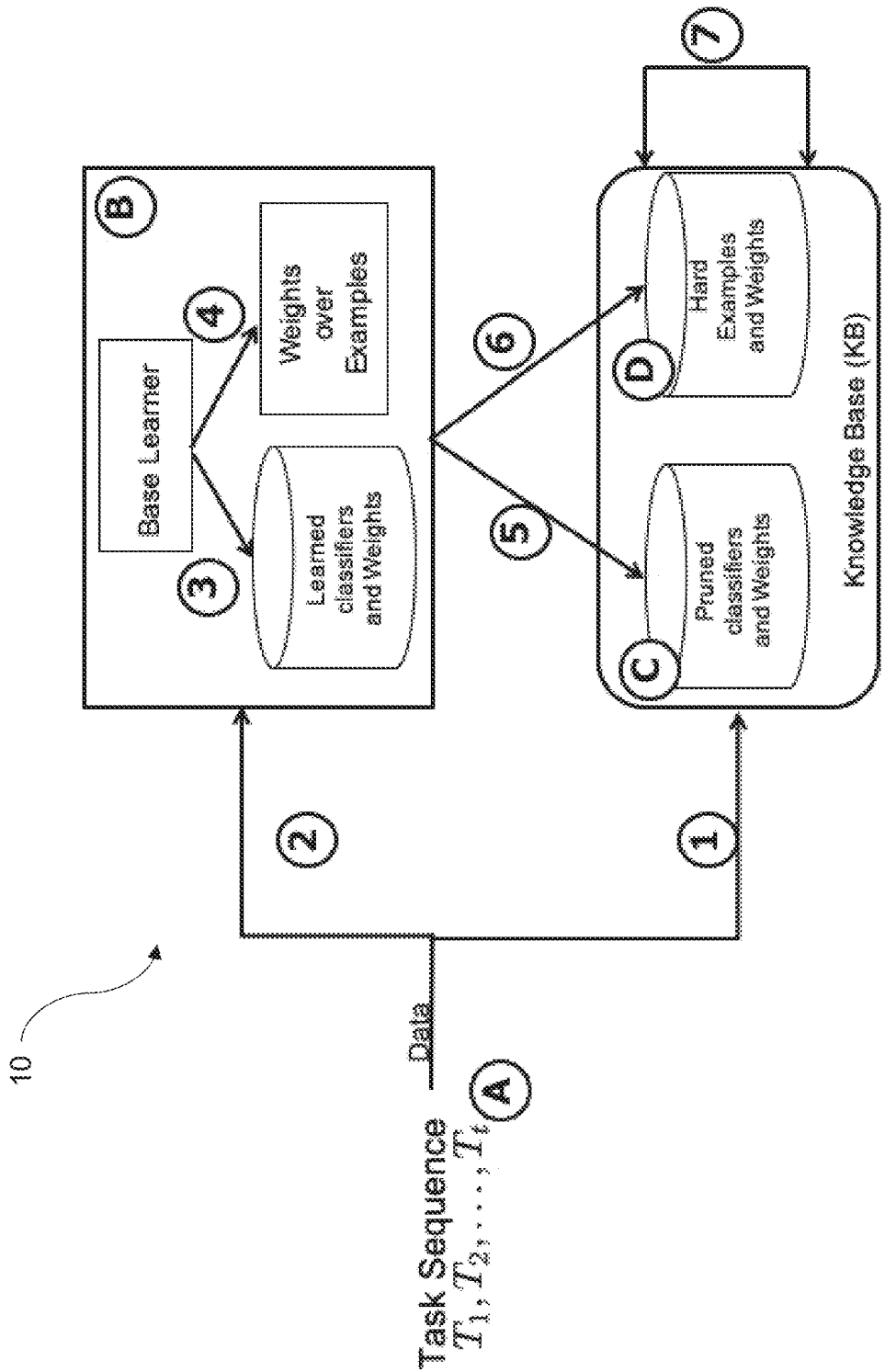
FIG. 1 schematically illustrates a method and system according to embodiments of the present invention.

Embodiments of the present invention provide a boosting-based approach for lifelong machine learning which sequentially learns a set of base classifiers for each new task. The proposed method and system according to embodiments of the present invention are especially advantageous and well-suited for when the number of samples for a new task is small. Among other improvements, the boosting-based approach according to embodiments of the present invention delivers benefits in terms of learning accuracy, retained accuracy, forward transfer of information, backward transfer of information and performance on a new task with a relatively low number of training examples. The number of training examples used is preferably less than 30% of the original examples which are available from tasks, and are selected from the original examples based on their weights in the learning sample. The proposed method and system according to embodiments of the present invention are applicable to both statistical and neural network base learners.

An embodiment of the present invention provides a boosting-based lifelong machine learning algorithm that is referred to herein as "LLBoost." LLBoost sequentially learns a set of tasks. LLBoost creates a set of base classifiers for each new task (with a relatively low number of number of training examples) using previously learned knowledge and without forgetting on previous tasks. Significant technological improvements which are achieved by a method or system implementing LLBoost include: i) providing the ability to learn with a lower number of training examples for a new task; ii) improving the performance of the new task without deteriorating performance on previous tasks (positive forward transfer); and iii) improving the performance on previous tasks with additional new tasks (positive backward transfer).

A learning sample for a task refers to data for the task which comprises a set of training examples. Each example has a weight so as to provide a distribution of weights over the learning sample. When the data for new task is received, each example is weighted equally. The weights of the examples over the learning sample are updated using previously learned classifiers from old tasks and new task-specific classifiers. These weights are updated based on performance of the classifiers. More weight is given to those examples which are misclassified by base classifiers. For example, if an example is misclassified by a base classifier, its weight is increased (e.g., proportionally based on classification error) Accordingly, the examples which have higher weight can be referred to as "hard to classify" examples.

In an embodiment, the present invention provides a method for lifelong machine learning using boosting includes receiving a new task and a learning sample for the new task. A distribution of weights is learned over the learning sample using previously learned classifiers from old tasks. A set of task-specific classifiers are learned for the new task using a boosting algorithm and the distribution of weights over the learning sample, whereby the distribution of weights over the learning sample is updated using the task-specific classifiers for the new task.

In an embodiment, the method further comprises updating the distribution of weights based on performance of the task-specific classifiers on the learning sample.

In an embodiment, the method further comprises selecting training examples from the learning sample based on the performance of the task-specific classifiers on the learning sample.

In an embodiment, a portion of the examples of the learning sample having the highest weights are selected as the training examples, wherein the highest weights correspond to the lowest classification accuracy of the task-specific classifiers on the portion of the examples.

In an embodiment, the portion of the examples is less than 30% of a total number of examples of the learning sample.

In an embodiment, the method further comprises pruning one or more of the task-specific classifiers based on performance of the task-specific classifiers on the learning sample.

In an embodiment, the method further comprises storing the task-specific classifiers which were not pruned, and using the stored task-specific classifiers for a subsequent iteration of the step of learning the distribution of weights over the learning sample using the previously learned classifiers which is performed for a subsequent task.

In an embodiment, the method further comprises learning weights over the task-specific classifiers which were not pruned using training examples from the old tasks to update a distribution of weights over the training examples from the old tasks, and storing the training examples from the old tasks with the updated distribution of weights for a subsequent iteration of the step of learning the distribution of weights over the learning sample using the previously learned classifiers which is performed for a subsequent task.

In an embodiment, the training examples are selected based on performance of examples of learning samples from the old tasks which result in the training examples having higher weights than other ones of the examples of the learning samples.

In an embodiment, a neural network is used as a base learner for learning the task-specific classifiers, wherein, at each iteration of the boosting algorithm, a new head is added to the neural network having classifier-specific parameters that are optimized using the updated distribution over learning sample.

In an embodiment, the method further comprises pruning heads from the neural network based on performance of a neural network classifier on the learning sample.

In an embodiment, the method further comprises using the neural network including the heads which were not pruned for a subsequent iteration of the method for a subsequent task.

In an embodiment, the tasks are in at least one of the medicine, predictive planning or transportation fields, and the learned task-specific classifiers for the tasks are applied in at least one of these fields for at least one of a medical diagnosis, a product demand prediction, a transportation demand prediction or a ridership prediction.

In another embodiment, the present invention provides a system comprising one or more processors which, alone or in combination, are configured to provide for execution of the following steps: receiving a new task and a learning sample for the new task; learning a distribution of weights over the learning sample using previously learned classifiers from old tasks; and learning a set of task-specific classifiers for the new task using a boosting algorithm and the distribution of weights over the learning sample, whereby distribution of weights over the learning sample is updated using the task-specific classifiers for the new task.

In a further embodiment, the present invention provides a tangible, non-transitory computer-readable medium having instructions thereon which, upon being executed by one or more processors, alone or in combination, provide for execution of any method according to an embodiment of the present invention.

According to an embodiment, the learning/updating of weights over a learning sample for a new task is provided. The learning sample of a new task originally has equal weights. Then, weights are learned/updated using the classifiers from old tasks. The weights from the old tasks are used when learning a set of task-specific classifiers for the new task, and these weights are updated again during the learning of the task-specific classifiers. Preferably, the weights are updated yet again after the learning of the task-specific classifiers based on performance of the task-specific classifiers (in total making 3 different updates to the weights which were originally equal). While learning the set of task-specific classifiers for the new task, the weights are also learned over classifiers. Moreover, for all the old tasks, weights are learned over new task specific classifiers using the examples from old tasks.

Referring to FIG. 1, a system 10 according to an embodiment of the present invention includes four main components: a task sequence component A, a base learner B, a pruned classifier and weights storage C and a hard examples and weights storage D. The task sequence component A receives a sequence of tasks and data for these tasks. The base learner B receives the input data and applies a machine learning algorithm to learn a set of task-specific classifiers, weights over the classifiers and weights over the examples. The pruned classifier and weights storage C stores a set of pruned classifiers for all tasks and weights over the classifiers for all tasks. The hard examples and weights storage D stores a set of hard examples and weights over examples for all tasks. The pruned classifier and weights storage C and the hard examples and weights storage D form a knowledge base (KB).

The system 10 of FIG. 1 including the task manager A, the base learner B, the pruned classifier and weights storage C and the hard examples and weights storage D, interact to perform a method according to an embodiment of the present invention including steps 1-7 shown in FIG. 1 and described as follows:

1) In step 1, the method uses the previously learned knowledge from old tasks and learns weights over a learning sample for a new task comprising examples (new data for the new task) using previously learned models/classifiers in the pruned classifier and weights storage C. The learned weights over the classifiers for new data are stored in the pruned classifier and weights storage C of the KB. This step accordingly learns/updates the distribution of weights over the input learning sample for the new task. For example, initially, each example of the learning sample has equal weight, and these weights are updated based on the previously learned classifiers. This step achieves the forward transfer of the knowledge from old tasks to a new task. The sequence of tasks and data for the tasks, and therefore the new learning sample (examples/data for the new task), are received from the task manager A for performing step 1. The method learns the weights over the learning sample using the previously learned classifiers.

2) In step 2, the base learner B receives the learning sample and weights over the learning sample using the previously learned classifiers.

3) In step 3, the base learner B, which executes a learning algorithm, sequentially learns the set of base classifiers and weights over them for the new task. Preferably, these are stored in a database or memory of the base learner B.

4) In step 4, the base learner B also maintains a distribution of weights over the learning sample in order to learn task-specific classifiers. Step 3 and step 4 operate to learn task-specific knowledge which is not covered by previous tasks. In step 1, the weights are learned over the previously learned classifiers from old tasks and, in step 4, weights are learned over the newly learned classifiers for the new task.

5) In step 5, some of the newly learned classifiers from the new task are pruned based on the performance of the task-specific classifiers on the learning sample, which is weighted according to the weights as updated in step 4. For example, 20% of the task-specific classifiers which were learned can be pruned based on the performance. This improves memory efficiency and saves computational resources.

6) In step 6, a relatively low number of examples which are hard to classify based on the performance of the base learners on the learning sample, for both new and old task-specific classifiers, are stored in the hard examples and weights storage D. The learning samples for the tasks comprise weighted examples that are used as training data or training examples. This step allows to achieve the backward transfer of knowledge from future tasks to old tasks.

7) In step 7, the KB is updated such that the weights over newly learned classifiers for old tasks are learned using the hard examples from the old tasks. The hard examples of the learning samples from each of the old tasks and are selected based on the weights of the examples. This step can select examples which have a higher weight. Preferably, the number of examples selected from the learning samples is less than 30% of a total number of examples of the learning samples, in particular, less than 30% of the examples having the highest weights in the learning samples. This step achieves backward transfer of knowledge.

Figure 2:
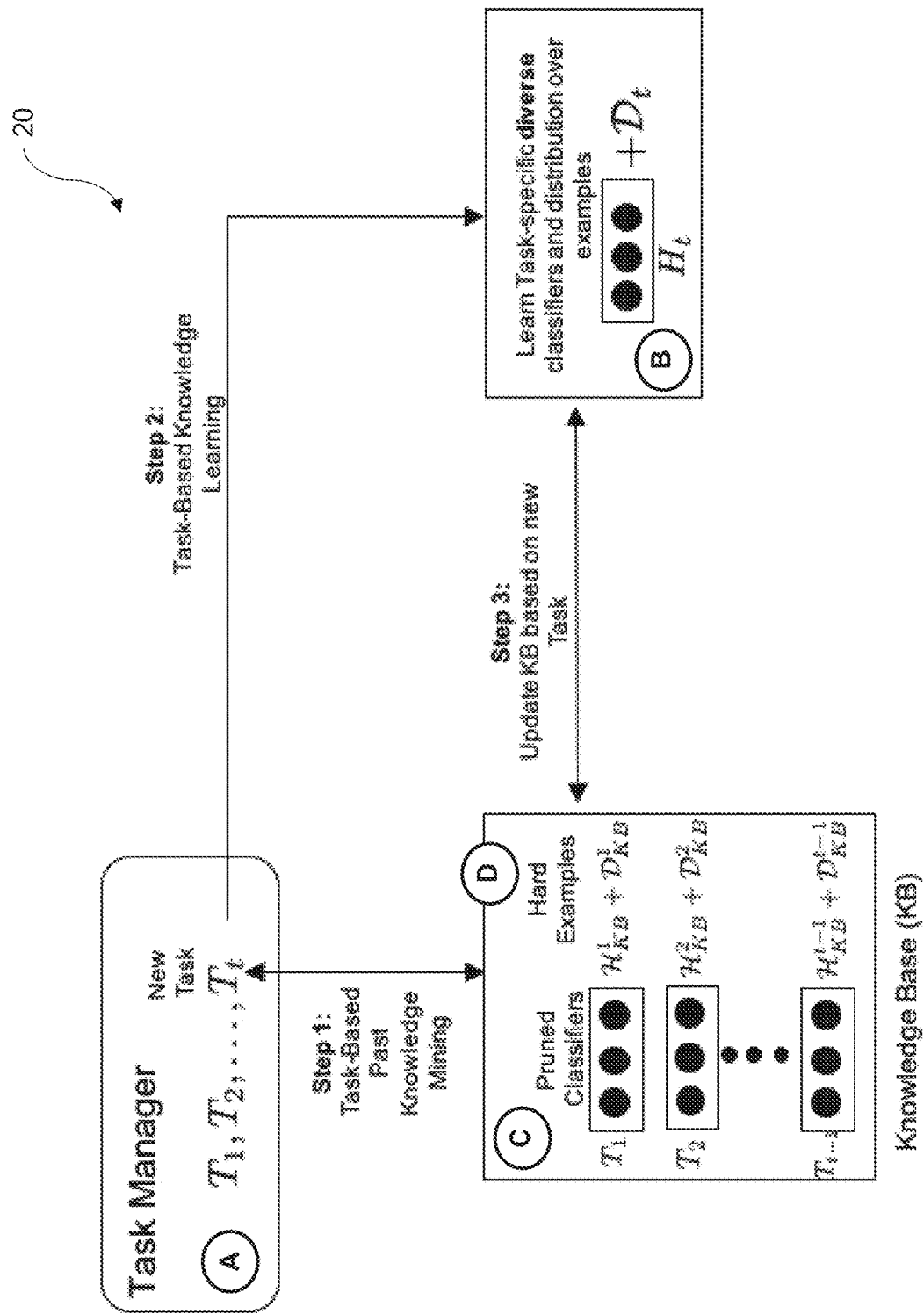
FIG. 2 schematically illustrates a pipeline of a machine learning algorithm according to an embodiment of the present invention.

FIG. 2 illustrates a pipeline 20 for performing LLBoost according to an embodiment of the present invention which includes the task manager A, the base learner B and the KB (with the pruned classifier and weights storage C and the hard examples and weights storage D) interacting to perform steps 1-3 shown in FIG. 2 and described in Algorithm 1 below (and in FIG. 3) and as follows:

Notations: Let $\mathcal{T}$ be the set of T tasks. For each task $t \in \mathcal{T}$, a learning sample $S_t = \{(x_i^t, y_i^t)\}_{i=1}^{n_t}$ is received. The KB is maintained such that $\forall t \in \mathcal{T}$, there is $D_{KB}^t = \{S'_t, \mathcal{D}'_t\}$ which store the set of hard examples and weights over them; $\mathcal{H}_{KB}^t$ is the set of task-specific classifiers; and $Q_{KB}^t$ is the weights over the task-specific classifiers.

1) Task-based past knowledge mining: For the new task t, step 1 learns the weights over previously learned old tasks' (t'<t) classifiers in the following way:

$$\forall t' < t, \forall h_{KB}^{t'} \in \mathcal{H}_{KB}^{t'}: \text{Compute } Q_{KB}^t(h_{KB}^{t'}) = \frac{1}{2}\left[\ln\left(\frac{1 - R_{\mathcal{D}_t}(h_{KB}^{t'})}{R_{\mathcal{D}_t}(h_{KB}^{t'})}\right)\right]$$

where $R_{\mathcal{D}_t}(h_{KB}^{t'}) = \Sigma_{i=1}^{n_t} \mathcal{D}_t(x_i^t) \cdot I[h_{KB}^{t'}(x_i^t) \neq y_i^t]$ is the weighted error on the new task's learning sample $S_t = \{(x_i^t, y_i^t)\}_{i=1}^{n_t}$. Where, I[p] is 1 if the predicate p is true, and 0 otherwise. This step 1 gives more weight to those old tasks' classifiers which have low classification error on the new task's learning sample by counting the errors (wrong classifications) of the classifier on the dataset. Finally, the distribution $\mathcal{D}_t$ over the learning sample $S_t$ is updated as follows:

$$\forall (x_i^t, y_i^t) \in \mathcal{D}_t, \mathcal{D}_t(x_i^t) \leftarrow$$

$$\frac{\mathcal{D}_t(x_i^t)\exp\left(\frac{1}{t}\sum_{t'=1}^{t} \mathbb{E}_{h_{KB}^{t'} \sim \mathcal{H}_{KB}^{t'}} I[h_{KB}^{t'}(x_i^t) \neq y_i^t]\right)}{\sum_{j=1}^{n_t} \mathcal{D}_t(x_j^t)\exp\left(\frac{1}{t}\sum_{t'=1}^{t} \mathbb{E}_{h_{KB}^{t'} \sim \mathcal{H}_{KB}^{t'}} I[h_{KB}^{t'}(x_j^t) \neq y_j^t]\right)}$$

whereby this step 1 gives more weight to those examples which are misclassified by the ensemble of previous tasks' classifiers. Accordingly, step 1 of the algorithm extracts shared knowledge between old tasks and a new task by identifying the new training examples which can be correctly classified using the previously learned knowledge (forward transfer of knowledge). Also, step 1 gives more weight to those examples which are specific to the new task (in other words, the examples which bring task-specific knowledge).

2) Task-based knowledge learning: In step 2, new task-specific knowledge (which is not captured by previous tasks) is learned by learning new task-specific classifiers. Following boosting paradigm (see, e.g., Dietterich, T. G., "Ensemble methods in machine learning," Multiple Classifier Systems, pp. 1-15 (2000), which is hereby incorporated by reference herein), a set of weak base learners (e.g., decision trees, random forests, support vector machines (SVMs), etc.) are iteratively learned with different probability distributions over the learning sample $s_t$. Then, a relatively low number of new training examples are selected which are hard to classify based on a distribution of current weights $\mathcal{D}_t$ over training examples and are stored in the KB (stored examples and weights over examples are represented as $D_{KB}^t = \{S'_t, \mathcal{D}'_t\}$). By storing the relatively low number of training examples, it is possible to use them to transfer knowledge from new tasks to old tasks in step 3 of LLBoost (backward transfer). Training data can therefore be composed of new data samples and samples that are kept from old tasks (hard examples).

Finally, some of the new learned task-specific classifiers are removed based on weights over the classifiers. This is done to save computational resources and memory. The learned task-specific classifiers can be pruned in such a manner to decrease or maintain the size of the KB with every new task. The stored classifiers are represented as $\mathcal{H}_{KB}^{t}$.

3) Update KB based on new task: In step 3, firstly, the weights over the new task's classifiers are learned for previous tasks as follows:

$$\forall t' < t, \forall h_{KB}^{t} \in \mathcal{H}_{KB}^{t}: \text{Compute } Q'_{KB}(h_{KB}^{t}) = \frac{1}{2}\left[\ln\left(\frac{1 - R_{\mathcal{D}_{t'}}(h_{KB}^{t})}{R_{\mathcal{D}_{t'}}(h_{KB}^{t})}\right)\right]$$

whereby step 3 gives more weight to those new task's classifiers which have low classification error on previous tasks' examples. Classification error of any new classifier $h_{KB}^{t}$ are computed on previous tasks' stored training examples in the KB and examples are weighted according to distribution $\mathcal{D}'_{t'}$. This step 3 enables to determine the examples which are not correctly classified by previously learned tasks (or knowledge). Finally, the weights over previous tasks' stored examples are updated as follows:

$$\forall (x_i^{t'}, y_i^{t'}) \in \mathcal{D}_{t'}, \mathcal{D}_{t'}(x_i^{t'}) \leftarrow \frac{\mathcal{D}_{t'}(x_i^{t'}) \exp\left(\mathbb{E}_{h_{KB}^{t} \sim \mathcal{H}_{KB}^{t}} I[h_{KB}^{t}(x_i^{t'}) \neq y_i^{t'}]\right)}{\sum_{j=1}^{n_{t'}} \mathcal{D}_{t}(x_j^{t'}) \exp\left(\mathbb{E}_{h_{KB}^{t} \sim \mathcal{H}_{KB}^{t}} I[h_{KB}^{t}(x_j^{t'}) \neq y_j^{t'}]\right)}$$

According to an embodiment of the present invention, the following Algorithm 1 (shown similarly in FIG. 3) is executed using memory and one or more processors to implement LLBoost.

---

Algorithm 1

---

Input: Let $\mathcal{T}$ be a set of T tasks. For each task $t \in \mathcal{T}$, a learning sample $S_t = \{x_i^{t}, y_i^{t}\}_{i=1}^{n_t}$ is received.
Initialize: A Knowledge Base (KB) is maintained such that $\forall t \in \mathcal{T}$, there is $\mathcal{D}_{KB}^{t} = \{S_t', D_t'\}$, $\mathcal{H}_{KB}^{t}$ and $Q_{KB}^{t}$.
[Let N be the number of iterations for the boosting algorithm]
for t = 1 to T do
$\forall x_i^{t} \in S \mathcal{D}_t(x_i) \leftarrow 1/n_t$  //*Uniform distribution over the learning sample*//
//*Step 1: For new task t, learn weights over previous tasks' classifiers*//

- $\forall t' < t, \forall h_{KB}^{t'} \in \mathcal{H}_{KB}^{t'}: \text{Compute } Q'_{KB}(h_{KB}^{t'}) = \frac{1}{2}\left[\ln\left(\frac{1 - R_{\mathcal{D}_{t}}(h_{KB}^{t'})}{R_{\mathcal{D}_{t}}(h_{KB}^{t'})}\right)\right]$ where $R_{\mathcal{D}_t}(h_{KB}^{t'})$ is weighted error on $S_t$

- $\forall (x_i^{t}, y_i^{t}) \in \mathcal{D}_t, \mathcal{D}_t(x_i^{t}) \leftarrow \frac{\mathcal{D}_t(x_i^{t}) \exp\left(\frac{1}{t}\sum_{t'=1}^{t} \mathbb{E}_{h_{KB}^{t'} \sim \mathcal{H}_{KB}^{t'}} I[h_{KB}^{t'}(x_i^{t}) \neq y_i^{t}]\right)}{\sum_{j=1}^{n_t} \mathcal{D}_t(x_j^{t}) \exp\left(\frac{1}{t}\sum_{t'=1}^{t} \mathbb{E}_{h_{KB}^{t'} \sim \mathcal{H}_{KB}^{t'}} I[h_{KB}^{t'}(x_j^{t}) \neq y_j^{t}]\right)}$ //*Step 2: For new task t, learn task specific classifiers. Select a relatively low number of hard examples and prune classifiers for KB*//
- Run a boosting algorithm (e.g., Adaboost) with $D_t$ as the distribution over the set of examples of the learning sample $S_t = \{x_i^{t}, y_i^{t}\}_{i=1}^{n_t}$ for N iterations to return a set of task-specific classifiers $H_t$, and the distribution $D_t$ of weights over the learning sample $S_t$.
- Select a relatively low number of hard examples $S_t$' from the set of examples learning sample $S_t$ based on the distribution $\mathcal{D}_t$ and update $D_{KB}^{t} = \{S_t', D_t'\}$
- Classifier-weight based pruning of task-specific classifiers $\mathcal{H}_{KB}^{t}$ and then update the set of task-specific $\mathcal{H}_{KB}^{t}$.
//*Step 3: For previous tasks t' < t, learn weights over new tasks' classifiers*//

- $\forall t' < t, \forall h_{KB}^{t} \in \mathcal{H}_{KB}^{t}: \text{Compute } Q'_{KB}(h_{KB}^{t}) = \frac{1}{2}\left[\ln\left(\frac{1 - R_{\mathcal{D}'_{t'}}(h_{KB}^{t})}{R_{\mathcal{D}'_{t'}}(h_{KB}^{t})}\right)\right]$ where $R_{\mathcal{D}'_{t'}}(h_{KB})$ is error on $S_{t'}$'
- For all the tasks t' < t, update the distribution over samples for the previous tasks as follows:

$$\forall (x_i^{t'}, y_i^{t'}) \in \mathcal{D}_{t'}, \mathcal{D}_{t'}(x_i^{t'}) \leftarrow \frac{\mathcal{D}_{t'}(x_i^{t'}) \exp\left(\mathbb{E}_{h_{KB}^{t} \sim \mathcal{H}_{KB}^{t}} I[h_{KB}^{t}(x_i^{t'}) \neq y_i^{t'}]\right)}{\sum_{j=1}^{n_{t'}} \mathcal{D}_{t}(x_j^{t'}) \exp\left(\mathbb{E}_{h_{KB}^{t} \sim \mathcal{H}_{KB}^{t}} I[h_{KB}^{t}(x_j^{t'}) \neq y_j^{t'}]\right)}$$

end
Return: Knowledge Base (KB). For any example from task t, the output is predicted by majority vote over all the task specific classifiers in KB which are weighted according to $Q_{KB}^{t}$ and weights over tasks $W_{KB}$.

The basic mechanism for boosting according to an embodiment of the present invention used in step 2 is based on showing to the single learner the same dataset. When the learner is weak, meaning that the learned base classifiers are better than random guessing, but imperfect (e.g., decision trees, random forests, support vector machines (SVMs), etc.), the performance of multiple learners is combined and updated via the boosting mechanism according to an embodiment of the present invention. If the learners are not weak, it is possible to build "diverse" learners by:

1) Randomly proposing a sub-set of the features; and
2) Providing a perturbed dataset (boosting on the data, e.g., by subsampling, linear combination, oversampling, etc.).

Figure 4:
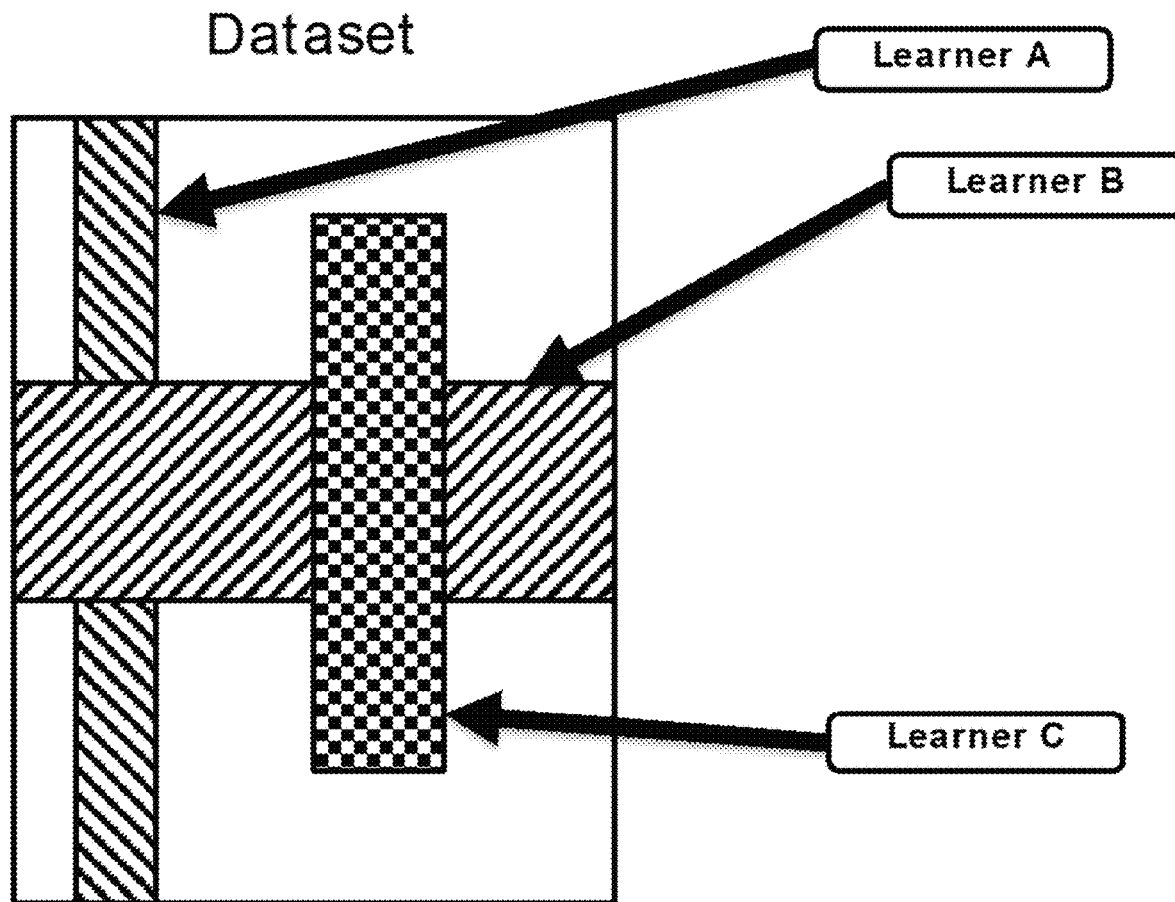
FIG. 4 schematically illustrates a diverse learner according to an embodiment of the present invention.

FIG. 4 shows an example of diverse learners A, B, C over a dataset. In this example, each learner A, B, C is associated with a selection function g (D) that returns the sub-set of the dataset where the learner is applied. The function g is defined such that it is not dependent on the task, e.g., by using feature selection. For example, learner A operates on the sub-set of the features, learner B operates on a sub-set of the dataset and learner C operates on sub-sets of the features and the dataset.

Figure 5:
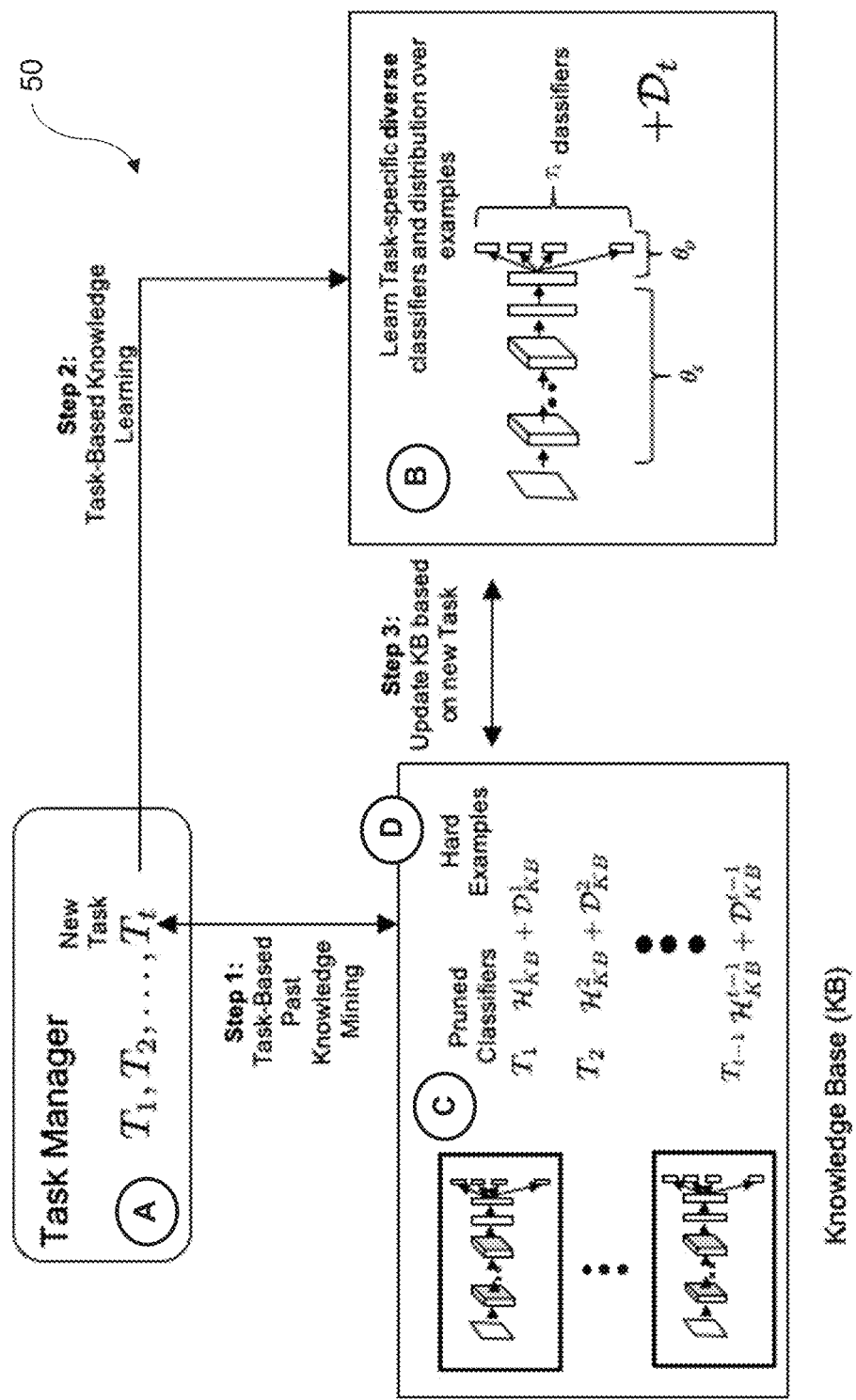
FIG. 5 illustrates a scenario with different multi-head neural networks for new tasks.
Figure 6:
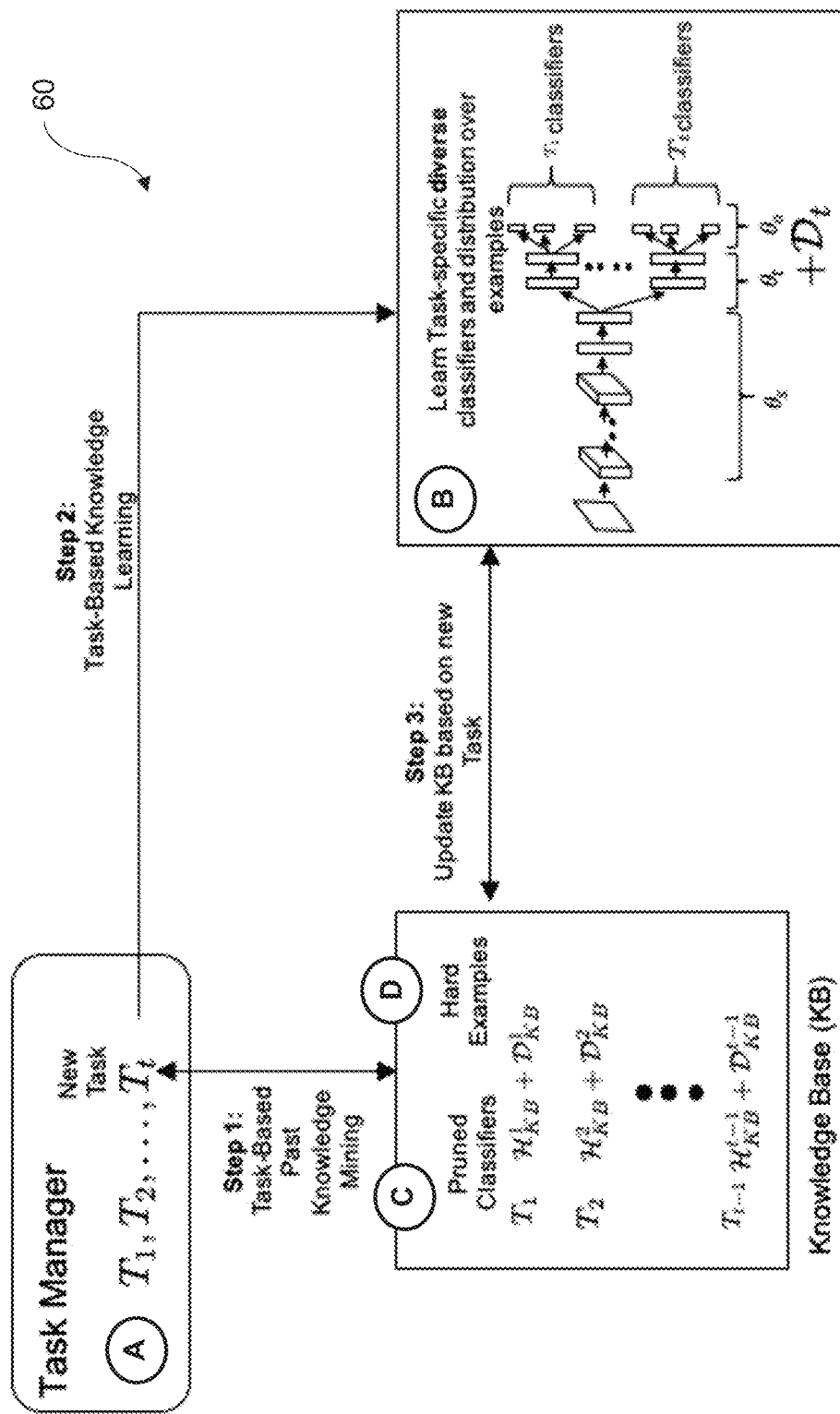
FIG. 6 illustrates a scenario with the same multi-head neural network for new tasks.

FIGS. 5 and 6 illustrate different embodiments of the present invention using LLBoost for multi-head neural network boosting.

FIG. 5 illustrates a method and system 50 for an embodiment with different multi-head neural networks. As in the embodiments above, the system 50 includes the task manager A, the base learner B and the KB (with the pruned classifier and weights storage C and the hard examples and weights storage D) interacting to perform steps 1-3 shown in FIG. 5. LLBoost can use a neural network in the base learner B. For each task, a neural network is deployed with multiple heads. In each case, the multi-head neural network is learned with a set of shared parameters $\theta_s$ for a few network layers and classifier specific parameters $\theta_o^i$. At each iteration i of the boosting algorithm in step 2, a new head is added to the neural network and the classifier-specific parameters $\theta_o^i$ are optimized using weighted distribution over the input learning sample. At the end of N iterations of boosting, a set of $\theta_s$ and N, $\theta_o^i$ parameters are obtained. Finally, the task-specific classifiers (heads) are pruned based on the performance of a neural network classifier (one of the task-specific classifiers (heads)) on the learning sample. After learning t tasks, there will be t multi-head neural networks.

FIG. 6 illustrates a method and system 60 for an embodiment with the same multi-head neural network. As in the embodiments above, the system 60 includes the task manager A, the base learner B and the KB (with the pruned classifier and weights storage C and the hard examples and weights storage D) interacting to perform steps 1-3 shown in FIG. 6. LLBoost can also maintain a single neural network for multiple tasks. In this case, there is only one set of shared parameters $\theta_s$, while there is a set of task specific parameters $\theta_t$ and a set of classifier specific parameters $\theta_o^i$ (corresponding to each task). In a simpler configuration using the same NN for all tasks, the set of task specific parameters $\theta_t$ is not present. Rather, there is $\theta_t^i$ which are the i-th set of parameters for task t. For any new task t, the neural network will optimize the task specific parameters and then, at each iteration of the boosting algorithm, the classifier-specific parameters $\theta_o^i$ are optimized using weighted distribution over the input learning sample. At the end of N iterations of boosting for a particular task t, the result is a set of $\theta_s$, $\theta_t$ and N, $\theta_o^i$ parameters. Finally, the task-specific classifiers (heads) are pruned based on the performance of a neural network classifier on the learning sample. After learning t tasks, there is one neural network with t multi-heads.

The update of the shared multi-task parameters ($\theta_s$) in this case can avoid changing the past learned basic learners for the previous tasks. To do so, a mechanism is used to force the gradient to change only in directions that do not affect past learned tasks. This is obtained by including in the loss function of the neural network, a cost related to the learners in the KB and the sample for the specific learner. This allows to have a shared parameter set, thus reducing the space requirement.

Embodiments of the present invention has applications in a number of technical fields such as medicine, predictive planning and transportation.

An embodiment of the present invention can be applied for medical diagnostics. Machine learning techniques are commonly used for medical diagnostics since most modern hospitals perform data collection and analysis on a large scale. The prediction task for a medical diagnosis can be modelled as a supervised learning problem, where the input is a set of features related to patients (e.g., medical history, previous treatments, results of analyses, etc.) and the target is whether or not a patient is diagnosed with the condition in question. Currently, it is common to train a machine learning model for each specific medical task individually using a large number of labeled training dataset. However, in the medical domain, the number of potential tasks is large and annotating data for each task can be time-consuming and costly. Therefore, it is especially advantageous to utilize pre-acquired knowledge in order to adapt a previously learned model to a new task using a relatively low number of labeled training examples. Embodiments of the present invention can be directly applied to medical applications where new tasks arrive sequentially (e.g., segmentation of normal structures and segmentation of white matter lesions in brain magnetic resonance imaging (MRI), treating electronic health record (EHR) systems as different tasks, etc.). The technological improvements provided by embodiments of the present invention in medical applications include: i) being able to learn from a relatively low number of training examples for new tasks; and ii) being able to effectively transfer knowledge between old and new tasks. These improvements can be provided, for example, through steps 1, 6 and 7 of FIG. 1.

In another embodiment, the present invention can be used for predictive planning. For example, the prediction of product sales from the collected sales historical data is an important technological application of machine learning methods. Improvements to the technology in order to predict sales more accurately can help suppliers and retailers avoid under-stocking of desired products, and at the same time, allow to avoid over-stocking undesired products. In this application, shop owners can anticipate the demand of products in the future, and take decisions that lead to increase in their profit. This is done by considering a lag variable of the sales of the last few past days and prediction problem is formulated to predict future sales based on what is learned from the past. In order to employ an embodiment of the present invention in the sales prediction problem, each product's sales historical data is considered as a task. However, in retail applications, new products are introduced frequently and therefore the number of examples for historical sales data is less. Therefore, it is especially advantageous to utilize pre-acquired knowledge from previous products to learn a machine learning model for a new task with less historical sales data. The technological improvements provided by embodiments of the present invention in product demand prediction applications are: i) being able to learn from less data for new products; and ii) being able to effectively transfer knowledge between old and new products. These improvements can be provided, for example, through steps 1, 6 and 7 of FIG. 1. Analogously, another example applied to the technological field of predictive planning, and in particular another product demand prediction application is manufacturing. Similar improvements would be applied in this application setting to manufacturers in order to provide more accurate predictions and thereby prevent over- or under-production of certain products.

In a further embodiment, the present invention can be used for applications in the transportation industry. For example, in intelligent transportation, dispatching, routing and scheduling transportation vehicles is partially or fully automated by computer systems and improved accuracy of demand and/or route predictions by the computer systems provide a number of advantages, such as higher customer satisfaction, less traffic congestion, less vehicle utilization, less air pollution and less wasted resources (e.g., fuel and computational resources). For example, an embodiment of the present invention can be applied to more effectively model and achieve a more accurate demand prediction, e.g., of travelers for a given route at a given transportation stop (e.g., bus stop) and a given time. In this example, the visits of busses to stops at given times are considered as tasks (e.g., each task is represented by the quadruple (route, bus, stop, time)). Real data is collected from bus providers about the actual trips and the demand of each trip. However, in the case of demand and ridership prediction, it can be challenging to predict demand for new bus stops and new routes because of less availability of historical data. Therefore, it is especially advantageous to utilize pre-acquired knowledge from previous demand and ridership predictions to learn a machine learning model for a new stop and/or route with less historical demand and ridership data. Applying an embodiment of the present invention in this setting also provides to learn from the past data to predict future demand at a specific location and a specific time in the future for a given route. The technological improvements provided by embodiments of the present invention in demand and ridership predictions in transportation applications include: i) being able to learn demand for new routes and new bus stops with less training data and; ii) will be able to effectively transfer knowledge between old and new tasks. These improvements can be provided, for example, through steps 1, 6 and 7 of FIG. 1.

Embodiments of the present invention in different applications provide for the following advantages and improvements:
1) The method and system applying LLBoost is able to extract the shared knowledge between old tasks and a new task by re-weighting of learned models with respect to the current task's data and previous tasks' difficult examples (e.g., through steps 1 and 7 of FIG. 1). In step 1 of FIG. 1, given a new task's training examples $S_t$ and the KB, the method and system learns weights over previously learned classifiers and updates the distribution over the learning sample $S_t$. This step 1 leads to forward transfer of knowledge from old tasks to new tasks. In step 7 of FIG. 1, the method and system updates the KB by learning the weights over the new task's classifiers for old tasks. This step 7 leads to backward transfer of knowledge. In contrast, boosting algorithms such as Adaboost do not transfer knowledge between multiple tasks.
2) The use of the hard examples selection strategy for each task based on the performance of base learners (from both old and new tasks) on the learning sample (step 6 using the base learner B and hard examples and weights storage D of FIG. 1) providing the ability to achieve even further backward transfer of knowledge.

In an embodiment, the present invention provides a method for lifelong machine learning using boosting, the method comprising:
1) Task-based past knowledge mining (step 1 of FIG. 1): Given a new task's learning sample $S_t$ and the KB, LLBoost first learns the weights over previously learned classifiers (from previous tasks) and updates the distribution $D_t$ over the learning sample $S_t$.
2) Task-based knowledge learning (steps 2-6 of FIG. 1): In steps 2-4 of FIG. 1, using the updated distribution D t over the learning sample $S_t$, LLBoost sequentially learns a set of task-specific classifiers using a boosting algorithm, such as Adaboost. Then, LLBoost selects a relatively low number of training examples which are hard to classify based on the current distribution $D_t$ (step 6 of FIG. 1) and prunes some of the newly learned task-specific classifiers based on weights over the classifiers (step 5 of FIG. 1). The selected hard examples $\{S'_t, D'_t\}$ and task-specific classifiers $\mathcal{H}_{KB}^t$ are stored in the KB (steps 5 and 6 of FIG. 1).
3) Update KB based on new task (step 7 of FIG. 1): In step 7, for old tasks, the KB is updated by learning the weights over the newly learned task-specific classifiers $\mathcal{H}_{KB}^t$ using old tasks' hard examples. Also, the distribution over the learning sample comprising the set of examples from the old tasks in each case (stored in the hard examples and weights storage D) is updated for the old tasks. This step achieves backward transfer of knowledge.

Experiments were conducted to demonstrate the improvements provided by embodiments of the present invention as discussed herein. The experiments were conducted on the following two datasets taken from the Modified National Institute of Standards and Technology (MNIST) database:
1) Split MNIST: The original MNIST dataset was split into five tasks based on input classes (i.e. 0/1, 2/3, 4/5, 6/7, 8/9)
2) Permuted MNIST: From the original MNIST dataset, the sequence of 5 tasks (with 10 classes) were generated by random permutations of input pixels.

Experimental Protocol: To evaluate the efficiency of LLBoost, the method and system implementing LLBoost is compared with the following boosting-based approaches:
1. Independent Ada: The independent Adaboost classifier is learned for each task with the number of base classifiers at 100 for each task.
2. Progressive Ada: The independent Adaboost classifier is learned for each task with an increasing number of classifiers, i.e., 100, 200, 300, 400 and 500, respectively.
3. Independent XGB: The independent gradient boosting is learned for each task with 100 decision tree base learners for each task.
4. Progressive XGB: The independent gradient boosting is learned for each task with an increasing number of decision tree learners for each task, i.e., 100, 200, 300, 400 and 500, respectively.
5. Online XGB: An online version of the gradient boosting approach, where for new task data, the previously learned model is updated. Here, 500 decision tree base learners were used.

6. Majority Vote: The Adaboost classifiers (with 100 base learners) are learned for each task, then a majority vote is taken over all the base learners of each task.
7. AdaboostrunData: A single Adaboost classifier (with 500 base learners) is learned using all the training data from all the tasks. 100 base learners were used to train the Adaboost classifier. 30% of original training examples for each task are fixed in the KB and 20% of learned classifiers for each task are pruned.

For the approaches Independent Ada, Progressive Ada, Majority Vote, AdaboostrunData and LLBoost, different base learning algorithms (decision trees and random forests) are tested in order to check the applicability to different base learning algorithms.

In the experiments, the number of training examples considered for the five tasks are 4,000; 2,000; 500; 100; and 50, respectively. For each task, the number of test examples was fixed to 10,000. All the experiments are repeated five times, each time splitting the training and test sets at random over the initial datasets.

Evaluation Metrics: LLBoost was compared to the baselines based on the following five metrics:
1) Learning Accuracy (LA): The average accuracy of each task after their own training.
2) Retain Accuracy (RA): The average accuracy of each task, after the last task is trained.
3) Forward Transfer of Information (FTI): The difference in accuracy between the task learned alone and after the previous task was learned. This accuracy is measured as the difference between the LA and independent task accuracy.
4) Backward Transfer of Information (BTI): The difference in accuracy between the task learned alone and after leaning other tasks. This accuracy is measured as the difference between the RA and LA.
5) Performance of task 5: The performance of the various approaches are compared on task 5 where there are a relatively low number of number of training examples (in this case 50).

The following Tables 1-6 (also shown in FIGS. 7-12, respectively) show the results of the experiments.

TABLE 1

Obtained results with decision trees as the base learner

| Algorithm | Split MNIST | | | | Permuted MNIST | | | |
|---|---|---|---|---|---|---|---|---|
| | LA | RA | BTI | FTI | LA | RA | BTI | FTI |
| IndependentAda | 96.680 | 96.680 | 0.0 | 0.0 | 78.195 | 78.195 | 0.0 | 0.0 |
| ProgressiveAda | 96.538 | 96.538 | 0.0 | −0.142 | 78.814 | 78.814 | 0.0 | 0.619 |
| IndependentXGB | 96.064 | 96.064 | 0.0 | −0.616 | 73.616 | 73.613 | 0.0 | −4.579 |
| ProgressiveXGB | 96.107 | 96.107 | 0.0 | −0.573 | 74.038 | 74.038 | 0.0 | −4.157 |
| OnlineXGB | 90.725 | 71.026 | −19.699 | −5.955 | 70.071 | 58.489 | −11.582 | −8.124 |
| Majority Vote | 78.028 | 78.028 | 0.0 | −18.652 | 61.952 | 61.952 | 0.0 | −16.243 |
| Adaboost$_{FullData}$ | 89.320 | 89.320 | 0.0 | −7.360 | 80.181 | 80.181 | 0.0 | 1.986 |
| LLBoost | 96.818 | 96.852 | 0.034 | 0.138 | 77.936 | 77.934 | −0.002 | −0.259 |

TABLE 2

Individual task performance for different methods when decision tree is used as the base learner

| Algorithm | Task Acc. | Task Seq. Split MNIST | | | | |
|---|---|---|---|---|---|---|
| | | Task 1 | Task 2 | Task 3 | Task 4 | Task 5 |
| IndependentAda | | 0.99724 | 0.977 | 0.9885 | 0.97998 | 0.8913 |
| ProgressiveAda | | 0.99740 | 0.97793 | 0.98981 | 0.97007 | 0.89169 |
| IndependentXGB | | 0.99742 | 0.97608 | 0.98472 | 0.96768 | 0.8773 |
| ProgressiveXGB | | 0.99742 | 0.97816 | 0.98481 | 0.9676 | 0.87732 |
| Majority Vote | | 0.7441 | 0.9224 | 0.7325 | 0.8310 | 0.6712 |
| Adaboost$_{FullData}$ | | 0.99558 | 0.96868 | 0.91419 | 0.9105 | 0.6770 |
| Online XGB | Task 1 | 0.99762 | 0.60224 | 0.39992 | 0.50246 | 0.4920 |
| | Task 2 | | 0.97438 | 0.91328 | 0.8574 | 0.80424 |
| | Task 3 | | | 0.96454 | 0.81952 | 0.63732 |
| | Task 4 | | | | 0.85946 | 0.8775 |
| | Task 5 | | | | | 0.74028 |
| LLBoost | Task 1 | 0.99742 | 0.99738 | 0.9974 | 0.99752 | 0.99746 |
| | Task 2 | | 0.97734 | 0.97728 | 0.97708 | 0.97748 |
| | Task 3 | | | 0.97236 | 0.97154 | 0.97178 |
| | Task 4 | | | | 0.9731 | 0.9752 |
| | Task 5 | | | | | 0.9207 |

TABLE 3

Individual task performance for different methods
when decision tree is used as the base learner

| | | Task Seq. Permuted MNIST | | | | |
|---|---|---|---|---|---|---|
| Algorithm | Task Acc. | Task 1 | Task 2 | Task 3 | Task 4 | Task 5 |
| IndependentAda | | 0.92923 | 0.91066 | 0.8423 | 0.67211 | 0.55544 |
| ProgressiveAda | | 0.92864 | 0.91466 | 0.84117 | 0.69004 | 0.56617 |
| IndependentXGB | | 0.91349 | 0.89413 | 0.82806 | 0.59417 | 0.45086 |
| ProgressiveXGB | | 0.91343 | 0.90608 | 0.83468 | 0.5967 | 0.45104 |
| Majority Vote | | 0.8063 | 0.78829 | 0.69466 | 0.4665 | 0.3418 |
| Adaboost$_{FullData}$ | | 0.92839 | 0.91124 | 0.85404 | 0.7137 | 0.60164 |
| Online XGB | Task 1 | 0.93414 | 0.88542 | 0.82358 | 0.7965 | 0.73838 |
| | Task 2 | | 0.90126 | 0.85276 | 0.82584 | 0.78932 |
| | Task 3 | | | 0.79898 | 0.70092 | 0.64442 |
| | Task 4 | | | | 0.52068 | 0.40388 |
| | Task 5 | | | | | 0.3485 |
| LLBoost | Task 1 | 0.92908 | 0.92902 | 0.92892 | 0.92908 | 0.92894 |
| | Task 2 | | 0.90976 | 0.90978 | 0.90986 | 0.90982 |
| | Task 3 | | | 0.8392 | 0.83946 | 0.83956 |
| | Task 4 | | | | 0.66274 | 0.66236 |
| | Task 5 | | | | | 0.55606 |

TABLE 4

Obtained results with random forest is used as the base learner

| | Split MNIST | | | | Permuted MNIST | | | |
|---|---|---|---|---|---|---|---|---|
| Algorithm | LA | RA | BTI | FTI | LA | RA | BTI | FTI |
| IndependentAda | 98.075 | 98.075 | 0.0 | 0.0 | 83.082 | 83.082 | 0.0 | 0.0 |
| ProgressiveAda | 98.207 | 98.207 | 0.0 | 0.132 | 83.119 | 83.119 | 0.0 | 0.037 |
| IndependentXGB | 96.064 | 96.064 | 0.0 | −2.011 | 73.616 | 73.613 | 0.0 | −9.466 |
| ProgressiveXGB | 96.107 | 96.107 | 0.0 | −1.968 | 74.038 | 74.038 | 0.0 | −9.044 |
| OnlineXGB | 90.725 | 71.026 | −19.699 | −7.350 | 70.071 | 58.489 | −11.582 | −13.011 |
| Majority Vote | 84.444 | 84.444 | 0.0 | −13.631 | 64.669 | 64.669 | 0.0 | −18.413 |
| Adaboost$_{FullData}$ | 86.209 | 86.209 | 0.0 | −11.866 | 82.782 | 82.782 | 0.0 | −0.300 |
| LLBoost | 98.189 | 98.134 | −0.055 | 0.114 | 83.194 | 83.200 | 0.006 | 0.112 |

TABLE 5

Individual task performance for different methods
when random forest is used as the base learner

| | | Task Seq. Split MNIST | | | | |
|---|---|---|---|---|---|---|
| Algorithm | Task Acc. | Task 1 | Task 2 | Task 3 | Task 4 | Task 5 |
| IndependentAda | | 0.9986 | 0.9828 | 0.9917 | 0.9896 | 0.9408 |
| ProgressiveAda | | 0.99828 | 0.98374 | 0.99314 | 0.99264 | 0.94258 |
| IndependentXGB | | 0.99742 | 0.97608 | 0.98472 | 0.96768 | 0.8773 |
| ProgressiveXGB | | 0.99742 | 0.97816 | 0.98481 | 0.9676 | 0.87732 |
| Majority Vote | | 0.9835 | 0.8453 | 0.7924 | 0.9456 | 0.6553 |
| Adaboost$_{FullData}$ | | 0.9966 | 0.9747 | 0.9354 | 0.9014 | 0.5020 |
| Online XGB | Task 1 | 0.99762 | 0.60224 | 0.39992 | 0.50246 | 0.4920 |
| | Task 2 | | 0.97438 | 0.91328 | 0.8574 | 0.80424 |
| | Task 3 | | | 0.96454 | 0.81952 | 0.63732 |
| | Task 4 | | | | 0.85946 | 0.8775 |
| | Task 5 | | | | | 0.74028 |
| LLBoost | Task 1 | 0.9986 | 0.9985 | 0.9984 | 0.9984 | 0.9984 |
| | Task 2 | | 0.98298 | 0.98298 | 0.98214 | 0.98226 |
| | Task 3 | | | 0.99362 | 0.9931 | 0.99212 |
| | Task 4 | | | | 0.98922 | 0.98892 |
| | Task 5 | | | | | 0.94498 |

TABLE 6

Individual task performance for different methods when random forest is used as the base learner.

| Algorithm | Task Acc. | Task 1 | Task 2 | Task 3 | Task 4 | Task 5 |
|---|---|---|---|---|---|---|
| IndependnetAda | | 0.94108 | 0.92344 | 0.87484 | 0.75618 | 0.65855 |
| ProgressiveAda | | 0.94029 | 0.92798 | 0.88428 | 0.75636 | 0.64704 |
| IndependentXGB | | 0.91349 | 0.89413 | 0.82806 | 0.59417 | 0.45086 |
| ProgressiveXGB | | 0.91343 | 0.90608 | 0.83468 | 0.5967 | 0.45104 |
| Majority Vote | | 0.80139 | 0.76626 | 0.69556 | 0.53443 | 0.43580 |
| $Adaboost_{FullData}$ | | 0.94060 | 0.92352 | 0.87748 | 0.75174 | 0.64578 |
| Online XGB | Task 1 | 0.93414 | 0.88542 | 0.82358 | 0.7965 | 0.73838 |
| | Task 2 | | 0.90126 | 0.85276 | 0.82584 | 0.78932 |
| | Task 3 | | | 0.79898 | 0.70092 | 0.64442 |
| | Task 4 | | | | 0.52068 | 0.40388 |
| | Task 5 | | | | | 0.3485 |
| LLBoost | Task 1 | 0.94016 | 0.9398 | 0.93952 | 0.93838 | 0.9374 |
| | Task 2 | | 0.9226 | 0.92254 | 0.9228 | 0.92268 |
| | Task 3 | | | 0.8741 | 0.87412 | 0.87346 |
| | Task 4 | | | | 0.75774 | 0.76134 |
| | Task 5 | | | | | 0.66514 |

The experiments therefore verify the following advantages and improvements provided by embodiments of the present invention:

1. The method and system implementing LLBoost is able to perform well, especially in the case with a lesser number of training examples for new task. For example, for task 5 with just 50 training examples, LLBoost performs better than all the baselines for Split MNIST (Table 2 and Table 5) and Permuted MNIST (Table 6).
2. The method and system implementing LLBoost is able to do positive transfer of information. For example, LLBoost has positive FTI for Split MNIST (Table 1) and for both Split and Permuted MNIST (Table 4).
3. The method and system implementing LLBoost is able to do positive backward of information. For example, LLBoost has positive BTI for Split MNIST (Table 1) and Permuted MNIST (Table 4).
4. The method and system implementing LLBoost is adaptable to different types of base learners (e.g., decision trees, random forests, neural networks, etc.)

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any sub-set from the listed elements, e.g., A and B, or the entire list of elements A, B and C.

What is claimed is:

1. A method for lifelong machine learning using boosting, the method comprising:
   receiving a new task's learning sample and a knowledge base (KB);
   learning weights over previously learned classifiers, and updating a distribution of weights over the learning sample;
   using the updated distribution of the weights over the learning sample, sequentially learning a set of task-specific classifiers using a boosting algorithm and the distribution of the weights over the learning sample;
   selecting less than 30% of samples from the learning sample which are hard to classify based on a corresponding distribution of weights over the learning sample and pruning some of the newly learned task-specific classifiers based on weights over the classifiers; and
   updating KB based on new task, for old tasks, by learning the weights over the newly learned task-specific classifiers using old tasks hard examples.

2. The method according to claim 1, wherein the method comprises: updating the distribution of weights based on performance of the task-specific classifiers on the learning sample.

3. The method according to claim 2, wherein the method comprises: selecting training examples from the learning sample based on the performance of the task-specific classifiers on the learning sample.

4. The method according to claim 3, wherein a portion of the examples of the learning sample having the highest weights is selected as the training examples, and wherein the highest weights correspond to the lowest classification accuracy of the task-specific classifiers on the portion of the examples.

5. The method according to claim 1, wherein the method comprises: pruning one or more of the task-specific classifiers based on performance of the task-specific classifiers on the learning sample.

6. The method according to claim 5, wherein the method comprises:
storing the task-specific classifiers which were not pruned; and
using the stored task-specific classifiers for a subsequent iteration of the step of learning the distribution of weights over the learning sample using the previously learned classifiers which is performed for a subsequent task.

7. The method according to claim 5, wherein the method comprises: learning weights over the task-specific classifiers which were not pruned using training examples from the old tasks to update a distribution of weights over the training examples from the old tasks; and storing the training examples from the old tasks with the updated distribution of weights for a subsequent iteration of the step of learning the distribution of weights over the learning sample using the previously learned classifiers which is performed for a subsequent task.

8. The method according to claim 7, wherein the training examples are selected based on performance of examples of learning samples from the old tasks which result in the training examples having higher weights than other ones of the examples of the learning samples.

9. The method according to claim 1, wherein a neural network is used as a base learner for learning the task-specific classifiers, and wherein, at each iteration of the boosting algorithm, a new head is added to the neural network having classifier-specific parameters that are optimized using the updated distribution over learning sample.

10. The method according to claim 9, wherein the method comprises: pruning heads from the neural network based on performance of a neural network classifier on the learning sample.

11. The method according to claim 10, wherein the method comprises: using the neural network including the heads which were not pruned for a subsequent iteration of the method for a subsequent task.

12. The method according to claim 1, wherein the tasks are in at least one of the medicine, predictive planning or transportation fields, and the learned task-specific classifiers for the tasks are applied in at least one of these fields for at least one of a medical diagnosis, a product demand prediction, a transportation demand prediction, or a ridership prediction.

13. A non-transitory computer-readable medium having instructions thereon which, upon being executed by one or more processors, alone or in combination, provide for execution of the following steps:
receiving a new task's learning sample and a knowledge base (KB);
learning weights over previously learned classifiers, and updating a distribution of weights over the learning sample;
using the updated distribution of the weights over the learning sample, sequentially learning a set of task-specific classifiers using a boosting algorithm and the distribution of the weights over the learning sample;
selecting less than 30% of samples from the learning sample which are hard to classify based on a corresponding distribution of weights over the learning sample and pruning some of the newly learned task-specific classifiers based on weights over the classifiers; and
updating KB based on new task, for old tasks, by learning the weights over the newly learned task-specific classifiers using old tasks hard examples.

* * * * *